(12) United States Patent
Koenig et al.

(10) Patent No.: US 6,456,260 B1
(45) Date of Patent: Sep. 24, 2002

(54) INDICATING DEVICE FOR VEHICLE

(75) Inventors: Winfried Koenig, Pfinztal; Reinhold Fiess, Durbach, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/197,002

(22) Filed: Nov. 20, 1998

(30) Foreign Application Priority Data

Nov. 21, 1997 (DE) .......................................... 197 51 649

(51) Int. Cl.$^7$ ................................................ G09G 5/00
(52) U.S. Cl. ................................... 345/7; 345/8; 345/9
(58) Field of Search ............................... 345/7, 8, 9

(56) References Cited

U.S. PATENT DOCUMENTS

| | | | | |
|---|---|---|---|---|
| 5,013,134 A | * | 5/1991 | Smith | 350/174 |
| 5,467,103 A | * | 11/1995 | Iino et al. | 345/7 |
| 5,497,271 A | * | 3/1996 | Mulvanny et al. | 359/631 |
| 5,867,133 A | * | 2/1999 | Toffolo et al. | 345/7 |
| 5,886,822 A | * | 3/1999 | Spitzer | 359/630 |

* cited by examiner

*Primary Examiner*—Richard Hjerpe
*Assistant Examiner*—Jean Lesperance
(74) *Attorney, Agent, or Firm*—Michael J. Striker

(57) ABSTRACT

An indicating device for a vehicle with an instrument board arranged in an image field of a driver in a control board of the vehicle, the indicating device has a unit for projecting at least one indicator on a projection surface in front of a driver seat and for forming a virtual image in front of a windshield of the vehicle, a common information source provided simultaneously for an information image forming on the instrument board in the control board and for an information image forming projected as a virtual image on the windshield of the vehicle.

13 Claims, 2 Drawing Sheets

INDICATING DEVICE FOR VEHICLE

BACKGROUND OF THE INVENTION

The present invention relates to an indicating device for vehicles.

It is known that provide in vehicles, in particular in motor vehicles indicating devices having a so-called head-up-display device which projects an indicator supplied by an indicating device onto a projection surface in front of a driver's seat and visually superposes a virtual image of the indicator of the outer landscape before the windshield. These indicating devices as a rule have a projector cooperating with an indicator which throws the light emitted by the indicator against the windshield. The windshield acts as a combining element and reflects the light and thereby makes ready a visible image for the driver as a virtual image before the windshield. This mirror-reflected information can be positioned at the end of the visible field of the driver at different heights. Important or hazard indicating informations can be also shown in the windshield center. Preferably with such virtual images, their visual position is in a region of several meters in front of the windshield, so that the driver for determination of these informations must neither use the glance on the windshield nor his eyes must be adjusted to a point inside the vehicle, mainly the indicator board. These accommodations of eyes are tiring and distract the attention of the driver for a certain time from road conditions.

Further indicating devices are known in the control panel of the vehicle such as speed, rotary speed and temperature indicators which operate analogously or are formed as digital indicating devices. Analog indicating devices can be actuated mechanically, for example through shafts or have a motor drive which is controlled by electrical sensor units. Digital indicating devices are normally controlled in electronic ways.

Further combinations of conventional indicating instruments in the control board and head-up-display devices are known, which are connected with one another mechanically, for example by a coupling of the motor-operated mechanical indicator with liquid crystal devices with optical projection system for the head-up-display. Also known further concepts for indication of for example speed and rotary speed in combined instrument by means of reverse projection of a laser beam onto a matt disc. Also it is known to use a laser as an image source for a head-up-display device.

The disadvantages of all these above mentioned concepts is a considerable structural expenses due to a required combination of individual independent indicating devices.

SUMMARY OF THE INVENTION

Accordingly, it is an object of present invention to provide a combined indicating device with a head-up-display and conventional combi instruments in a control panel, which has a simple construction.

In keeping with these objects and with others which will become apparent hereinafter, one feature of present invention resides, briefly stated, in an indicating device for a vehicle, in which the indicating device has a common information source which serves simultaneously with an information image forming on the instrument board in the control board and for an information forming as a virtual image on the windshield of the vehicle.

When the device is designed in accordance with the present invention, the indicating devices in the instrument board and the head-up-indicator forming in the windshield of the vehicle as a virtual image are provided in a simple and cost-favorable manner by an integrated unit with a common laser light source. The utilization of the laser light for image forming of the information which is important for the driver has the special advantage, that this light source can be superposed or modulated with all informations to be brought for indication. The laser light can be relatively easily provided both for polarization and for pulsing, and thereby for separation into several beam bundles with corresponding different indication informations.

When compared with other light sources, the laser light in addition has the advantage of very high light density, which in correspondence with a required indicating brightness can be modified or weakened relatively easy. For example, the outer light impingement on the windshield and the instrument panel can be detected by suitable sensors, and in dependence on the determined brightness values, the brightness of the laser light can be adjusted fast. In particular, during the day the very strong sun radiation can make a head-up-indicator difficult to read. This can be completely compensated by the high light densities of the laser light.

It is also advantageous that an optical deviating device is arranged after the beam bundle emitted by the laser light source and serves for a flat image forming of the indication information contained in the modulated laser light. This optical deviating device is preferably coupled so with a control unit for the laser light, so that periodically several beam bundles are formed with high frequency which are perceived by human eye of the driver as permanent indicators. This distribution of a single light source into several light bundles has the advantage that relatively easily several flat indicators can be controlled with high frequency switching-over, which due to repetition values of the human eye are perceived as constant indicators. The images of the beam bundles emitted by the optical deviating units can be projected by a suitable fixed or turnable mirror on matt discs. A first matt disc can be placed in the control board and projects the informations transmitted from the optical deviating device to the mirror onto the instrument panel. A second matt disc can be for example the windshield of the vehicle which projects a beam bundle deviated by a further mirror. The driver in this way can see virtual images which are located several meters from the windshield.

The combination of the instrument indicators and the head-up indicators with a common laser light source has the advantage that the driver can be presented with both indicators in a single outer appearance image. In particular, in this way an optimal determination between both indicator in types is possible. For example a danger hint can be provided in a combined form on both indicators. Possible are also alternating combination depending. on the operational condition of the vehicle. For example during sudden strong acceleration the indicator of the rotary speed meter can appear in the windshield as a head-up-indicator, so that during transition to constant driving condition to be released by the speed indicator. Such a programming has the advantage that the corresponding most important information is presented to the driver in the head-up-indicator on the windshield, to provide to him an optimal visibility in the traffic and to spare in particular the look at the instrument board. Here the informations with corresponding secondary dependence can be represented.

By suitable optical deviating and changing-over devices such as mirrors and prisms, in addition an optical utilization of the space available behind the control panel of the vehicle is possible. For example by suitable extension of the voluminous components in the region which is farther from the driver, a structural freedom can be provided in the vehicle for example for actuating levers or air guiding and outflow elements.

It is also recommended that the indicating devices for the outer radio or a navigation system be brought in position which is more suitable optically for the driver than in the conventional mounting locations, mainly in the central console. With the navigation aids with relatively small image screen representation, the deviation effect for the driver is very high. Such indicators can be easily integrated in an indicating device in accordance with the present invention and increase substantially the attention of the driver and thereby the driving safety.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
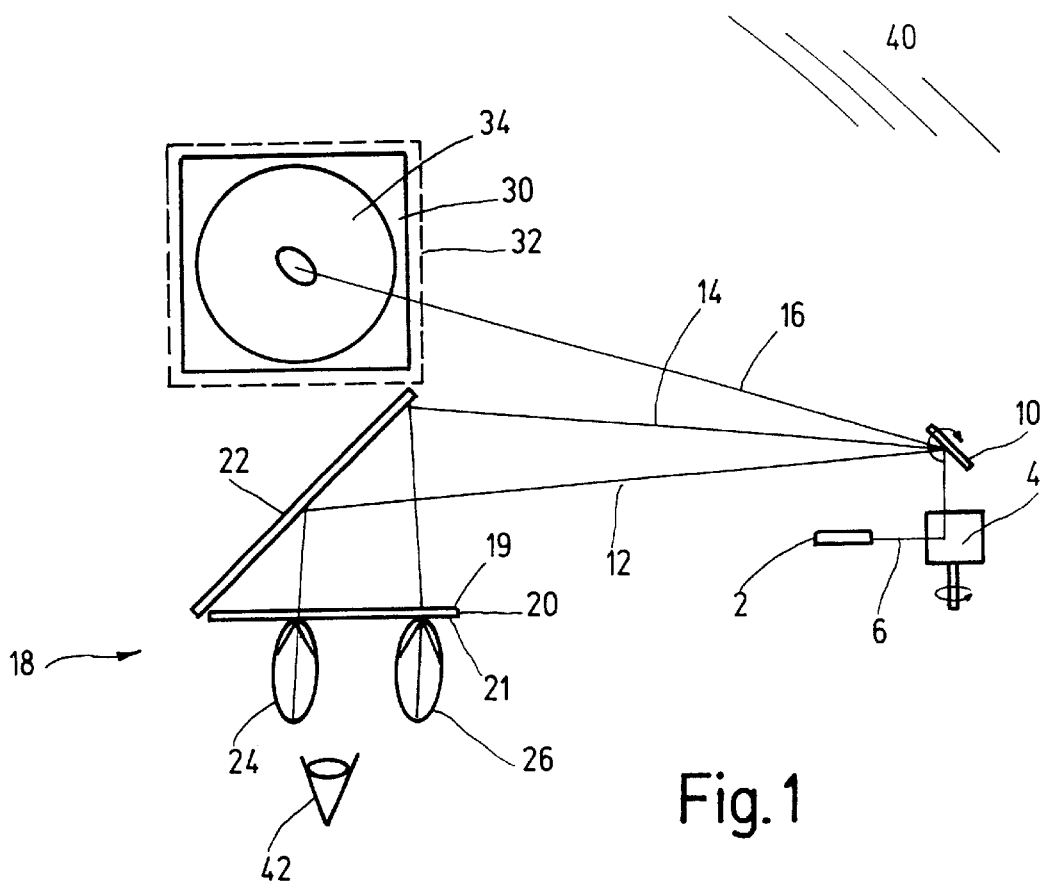
FIG. 1 is a plan view of an arrangement of an indicating device in accordance with the present invention.

FIG. 1 shows a plan view of a basic arrangement of the inventive indicating device. It includes a laser light source 2 which is stationarily arranged in a vehicle. It emits a coherent and strongly bundled laser beam in a visible wave length region. The laser light beam 6 is modulated with the informations represented on the indicating device.

The laser light bundle 6 impinges on a first optical deviating unit 4 which deviates the punctual and modulated laser light bundle in a plane perpendicular to the plane of the drawings. Thereafter the laser light bundle 6 impinges on a second deviating unit 10 which deviates a laser light bundle 6 additionally in a plane parallel to the plane of the drawings. Thereby the laser light bundle 6 periodically intersects a rectangular surface. In addition, the optical deviating unit 10 divides the laser light bundle 6 into several beam bundles 12, 14, 16 which are provided for formation of images of different indicators for the driver 42. The separation into several beam bundles 12, 14 and 16 and their periodical emission is performed with such a high frequency, for example greater than 100 Hertz, that the human eye of the driver 42 perceives the indicator pulsating with this high frequency as uninterrupted images.

A part of the beam bundles 12, 14, 16 falls on a first mirror 22 and is deviated by it to the rear side 19 of a matt (opaque) disc 24, where the laser light is reflected so that an indicating information is provided on the front side 21 of a matt disc 20. For such a representation, for example two beam bundles 12, 14 can be deviated to the first mirror 22, which are received by two indicating instruments 24 and 26 on the front side 21 of the matt disc 20. For example the beam bundle 12 can be projected on the indicating instrument 24 of an analog speed sensor, while the beam bundle 14 can be projected as an indicating instrument 26 for example of a rotary speed sensor, and the like.

The matt disc 20 can be arranged in correspondence with a conventional instrument board in the control board of the vehicle, so that the driver is familiarized with the indicating instruments 24 and 26 both as to their place, their arrangement, and their representation.

A further beam bundle 16 is deviated by the optical deviating units 4 and 10 to a second mirror 32, which is located under the windshield 40 of the vehicle. The mirror 32 deviates the beam bundle 16 so that it falls on a matt disc 30 and produces a visible intermediate image on it. The intermediate image is projected through a head-up-optic 34 and the windshield 40, serving as a partially permeable mirror (combinator), so that for the driver a side-oriented, virtual image of the information is provided several meters in front of the windshield 40 (so-called head-up-representation). This head-up-representation provides an image of instruments, warning indicators, or the like or similar hints important for the driver 42, located directly in the vision field.

Figure 2:
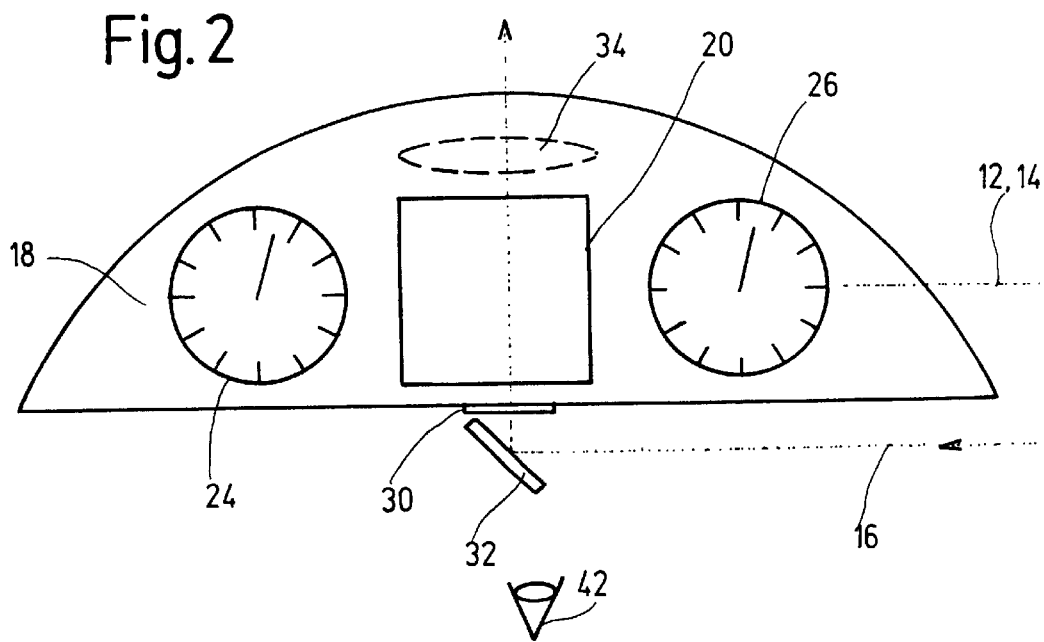
FIG. 2 is a front view of a further variant of the indicating device in accordance with the present invention.

FIG. 2 shows an indicating device on a front view. The same parts which are shown in FIG. 1 are identified with the same reference numerals. This figure shows an instrument board 18 in which several indicating instruments 24, 26 and an indicating field 20 for various informations are provided. For example, the indicating instrument 24 can be a speed indicator and the indicating instrument 26 can be a speedometer. In the indicating field 20 various hints are shown as pictograms, certain symbols and similar elements. It is however provided here that the total unit is compact. The beam bundles 12, 14, 16 which come from the optical deviating units 4 and 10 to the mirrors 22 and 32 for forming the indicators are located very close to one another. The mirror 22 for deviating the beam bundles 12, 14 for representing the total instrument board 18 is not identified in this showing and located for example behind the indicator board 20 which serves as a matt disc for representing the information.

The second mirror 32 for deviating the beam bundle 16 is located here under the instrument board, for example in a deep region inside the control board. It deviates the beam bundle 16 to the matt disc 30 and produces their visible image. It is guided behind the instrument board 18 through a head-up-optic 34 onto the windshield 40 of the vehicle and there deviated to the eye of the driver 42. The beam bundle 16 must be guided so that it is not screened by the components for image forming of the instrument information on the instrument board. The beam bundle leading to the head-up-optic 34 is guided along, for example behind the not shown first mirror 22.

Figure 3:
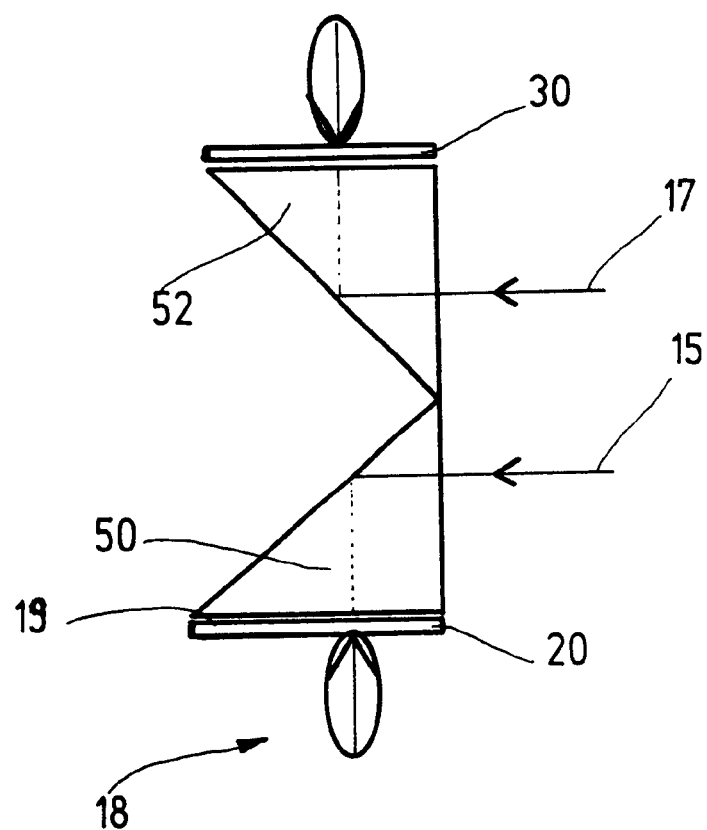
FIG. 3 is a plan view of a detail of an indicating device with two prisms in accordance with the present invention.

FIG. 3 shows a modified arrangement in which the deviation of the beam bundles 15, 16 deviated by the optical deviation units 4 and 10 is performed by two prisms 50, 52 instead of the mirrors. FIG. 3 shows a plan view on an exemplary arrangement of both prisms 50 and 52. Same parts which are shown in the preceding figures are identified with the same reference numerals. A first beam bundle 15 which comes from the not shown optical deviating units is deviated by prism 50 perpendicularly and projected on a rear side 19 of the matt disc 20, which is a part of an instrument board 18. A second beam bundle 17 is projected by a second prism 52 on a second matt disc 30 which serves for imaging forming of a head-up-information before the not shown windshield. Such an arrangement with two prisms 50, 52 can be very small and compact. Also, it is recommended to perform the deviation of the beam bundles 15, 16, 17 by several successively arranged prisms, whereby a substantial freedom in the positioning of the total optical unit including a laser light source, optical deviating units and deviating units by means of prisms, is provided inside the vehicle.

Figure 4:
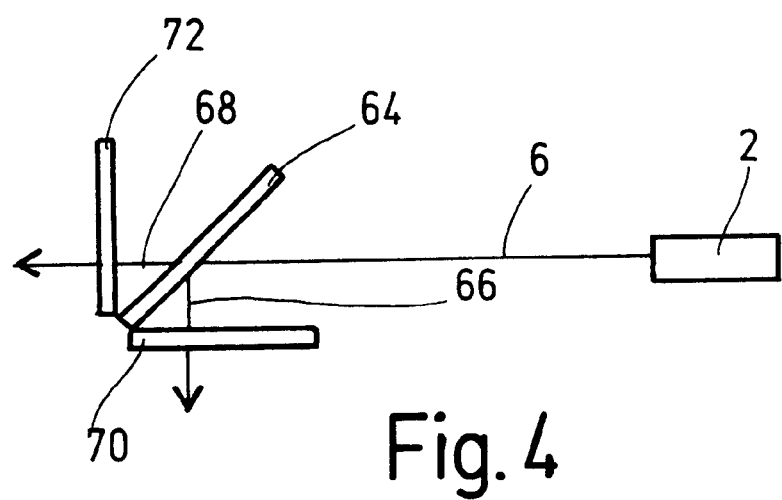
FIG. 4 is a plan view of a variant with a beam divider and two light locks in accordance with the present invention.

FIG. 4 finally shows a second variant of an indicating device on a plan view. It substantially includes a beam divider 64 and two light locks 70, 72. Same parts which are shown in the preceding figures are identified with same reference numerals. A light source 20 supplies a beam bundle 6 modulated with indicating informations which impinges on a beam divider 64. This beam divider 64 divides the beam bundle into two beam bundles, so that a part of the impinging light passes through it outer surface and a part with approximately the same intensity is reflected on its outer surface. Thereby a reflected beam bundle 66 and a passing beam bundle 68 are produced.

Both beam bundles 66, 68 impinge on light locks 70, 72, which are in such a position that only a part of the light beam emitted by the laser light source 20 can pass. The light locks 70 and 72 can be formed for example by so-called twisted pneumatic-liquid crystal cells, whose optical permeability can alternate and can be switched-over synchronously with the indicating content. When polarized laser beam is utilized, the twisted pneumatic liquid crystal cells on the corresponding first polarizer can be dispensed with. In this way the vision on the indicator informations contained in the beam bundle can be provided into a part determined for the instrument board and a part corresponding to the head-up-indicator.

Finally, further embodiments of a division of the beam bundle emitted by a single laser light source into several beam bundles are possible, for example by a mirror device located after the optical deviating unit. This mirror device can be provided for a separation into several beam bundles in a mechanical way, or can be formed for forming several beam bundles by a corresponding periodic cycling of the laser light and corresponding determined adjustment of the optical deviating unit. Also, combinations of the shown embodiments is possible, for example a combination of the device with a beam divider of FIG. 4, subsequently arranged liquid crystal-light locks, and beam deviating units with prisms or mirrors. In this way a freedom in the spacial arrangement in the control board or in an adjoining vehicle part can be provided.

It will be understood that each of the elements described above, or two or more together, may also find a useful application in other types of constructions differing from the types described above.

While the invention has been illustrated and described as embodied in indicating device for vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

What is claimed is:

1. An indicating device for a vehicle with an instrument board arranged in an image field of a driver in a control board of the vehicle, the indicating device comprising means for projecting at least one indicator on a projection surface in front of a driver seat and for forming a virtual image in front of a windshield of the vehicle; and a common information source formed as a laser light source and simultaneously producing an information image on the instrument board in the control board of the vehicle and an information image projected as a virtual image on the windshield of the vehicle, said laser light source being formed so that a laser light bundle emitted by said laser light source is modulated, so that it contains all informations provided for the information forming; and a deviating device which is composed of two optical deviating units which deviate the punctual and modulated laser light bundle in two different planes to intersect periodically at a rectangular surface.

2. An indicating device as defined in claim 1, wherein said laser light source is formed so that a laser light bundle emitted by said laser light source is modulated so that it contains all informations provided for the information forming.

3. An indicating device as defined in claim 2, wherein said laser light source is formed so that the laser light bundle is polarized; and further comprising a beam divider through which the laser light bundle passes and is subdivided into two beam bundles.

4. An indicating device as defined in claim 3; and further comprising a first light lock which allows passage of a laser light of a certain polarization and a first matt disc, arranged so that one of said beam bundles passes through said first light lock and falls on said first matt disc.

5. An indicating device as defined in claim 4; and further comprising a second light lock formed so that a laser light of a certain polarization can pass through said first light lock, and arranged so that the other of said beam bundles passes through said second light lock and falls on the windshield.

6. An indicating device as defined in claim 5, wherein said light locks are separately controllable so as to permit or prevent passage of a light having certain polarization.

7. An indicating device as defined in claim 2; and further comprising a deviating device which is composed of two optical deviating units which deviate the punctual and modulated laser light bundle to intersect periodically a rectangular surface.

8. An indicating device as defined in claim 7, wherein said optical deviating units periodically deviate and project the laser light bundle with such a high frequency that it is perceived by a human eye of a driver as uninterrupted images.

9. An indicating device as defined in claim 8, wherein said optical deviating units emit the projected laser light periodically alternatingly in several beam bundles in corresponding different directions.

10. An indicating device as defined in claim 8; and further comprising a micromechanical scanner mirror arranged so that the laser light projected by said optical deviating units is subdivided by said scanner mirror into several beam bundles.

11. An indicating device as defined in claim 10; and further comprising a first mirror and a first matt disc arranged so that the several beam bundles projected by the optical deviating units are projected through said first mirror on said first matt disc.

12. An indicating device as defined in claim 11, wherein said first matt disc is arrangeable in the control board of the vehicle so that the driver perceives the beam bundle deviated on the first matt disc and projected by an optical element as a virtual image before the windshield.

13. An indicating device for a vehicle with an instrument board arranged in an image field of a driver in a control board of the vehicle, the indicating device comprising means for projecting at least one indicator on a projection surface in front of a driver seat and for forming a virtual image in front of a windshield of the vehicle; and a common information source formed as a laser light source and simultaneously producing an information image on the instrument board in the control board of the vehicle and an information image projected as a virtual image on the windshield of the vehicle; and a deviating device which is composed of two optical deviating units which deviate the punctual and modulated laser light bundle in two different planes to intersect periodically at a rectangular surface.

* * * * *